Aug. 30, 1932.  O. K. MARTI ET AL  1,873,970
AUTOMATIC CIRCUIT BREAKER RECLOSING SYSTEM
Filed May 3, 1930
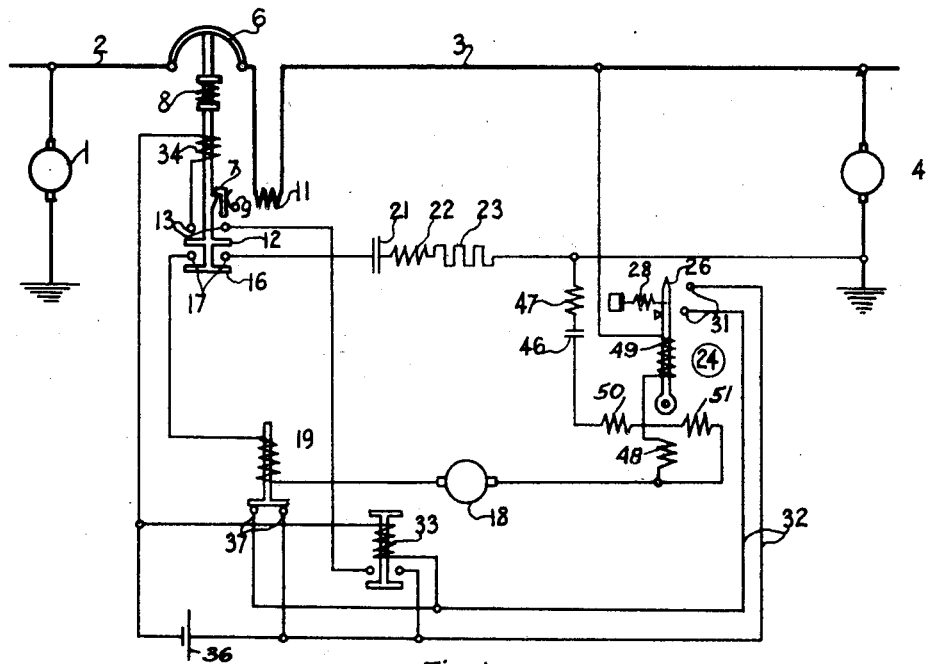
Fig.1
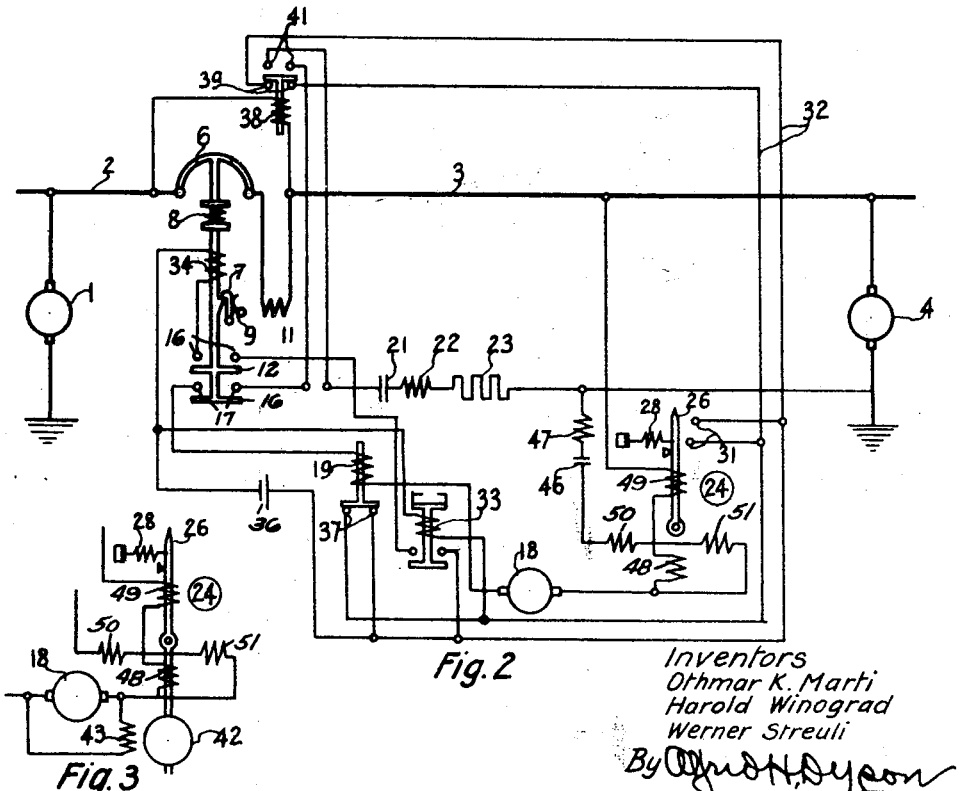
Fig.2
Fig.3
Inventors
Othmar K. Marti
Harold Winograd
Werner Streuli
By
Attorney.

Patented Aug. 30, 1932

1,873,970

UNITED STATES PATENT OFFICE

OTHMAR K. MARTI AND HAROLD WINOGRAD, OF HADDONFIELD, AND WERNER R. STREULI, OF CAMDEN, NEW JERSEY, ASSIGNORS, BY MESNE ASSIGNMENTS, TO ALLIS-CHALMERS MANUFACTURING COMPANY, OF MILWAUKEE, WISCONSIN, A CORPORATION OF DELAWARE

AUTOMATIC CIRCUIT BREAKER RECLOSING SYSTEM

Application filed May 3, 1930. Serial No. 449,514.

This invention relates to automatic circuit breaker reclosing systems in which a circuit breaker automatically reconnects a source of current and a load circuit as soon as such operation can be consummated without overloading the source of current and, more particularly, to a system which will operate satisfactorily on stub-end feeders, on multiple feeders, or on stub-end multiple feeders.

By stub-end feeders is meant a circuit supplied from a single source usually connected by a circuit breaker which may be equipped either with or without means for automatically reclosing the same when the circuit breaker is open. By multiple feeder is meant a circuit which is supplied with current from more than one source and the circuit is, therefore, energized when the above circuit breaker is open. In stub-end multiple feeders, either of the above conditions is present depending on the position of the circuit breakers connecting the sources to the system.

Numerous systems have been proposed to reclose a circuit breaker, after a disturbance such as an overload has caused opening thereof, such as the use of a time-delay device by which the circuit breaker is reclosed at certain intervals until the disturbance or overload has been cleared or is finally locked open if the disturbance continues. A resistance or resistances have also been placed across the circuit breaker to permit a small current to flow therethrough from the source to the load. The current flowing through or the voltage across the load, or a combination of such current or such voltage may be used to predetermine what load will be applied to the source upon reclosing of the circuit breaker. Such conditions may, therefore, be used to control the reclosing operation. Taking into account the usual current rise when the load is applied, it is possible to distinguish between overload and short circuits on the load circuit. However, the current used to distinguish between overload and short circuits or to determine the condition of the load network was heretofore direct current, taken from a power station bus bar or from a battery which had to be of such size as to supply the same normal voltage as the bus bar.

All of the known systems are subject to numerous disadvantages such as the danger to attendants from the full line voltage, which immediately appears when a short-circuit is being cleared, if the full line voltage is applied to the circuit through the circuit bridging resistance when the circuit breaker is open. If the short circuit which trips the breaker is sufficiently heavy, the machine supplying power to the bus bar will also be tripped out. It is then impossible, until the machine has again been started, to determine whether the conditions are such that the circuit breaker can be reclosed. Due to the fact that such reclosing is usually brought about by a time delay device, the circuit breaker is open for a longer time than is desirable. If the source of current supply is an electric current rectifier, it is difficult to obtain small currents at the steady voltage required to cause closing of the circuit. The common use of interphase transformers with rectifiers further complicates such closing, due to the fact that the direct current voltage at no load is then considerably higher than at higher loads.

It is, therefore, among the objects of the present invention to provide an automatic circuit breaker reclosing system in which, after the circuit breaker has been opened, alternating current is used to determine whether the load to be applied to the source of current does or does not exceed the predetermined limits.

Another object of the invention is to provide an automatic circuit breaker reclosing system for direct current breakers in which, after the circuit breaker has been opened, a wattmetric relay is used to measure the amount of alternating-current power consumed in the load circuit, which alternating-current power has a known relation to the load applied to the source of current upon closing of the circuit breaker.

Another object of the invention is to provide an automatic circuit breaker reclosing system in which, after the circuit breaker has been opened, back feed of direct current is prevented by condensers in the portions of the circuit which might otherwise be so affected.

Another object of the invention is to provide an automatic circuit breaker reclosing system in which, after the cirucit breaker has been opened, back feed of direct current is prevented by condensers in the portions of the circuit which might otherwise be so affected and in which the phase displacement of the alternating-current used caused by the condensers, is compensated by reactors connected in series with the condensers.

Another object of the invention is to provide an automatic circuit breaker reclosing system in which, after the circuit breaker has been opened, a minimum current relay is used in an alternating current test circuit to reclose the circuit breaker independently of the reclosing relay if the current is below a predetermined limit.

Another object of the invention is to provide an automatic circuit breaker reclosing system in which, after the circuit breaker has been opened, a wattmetric or voltmetric relay recloses the circuit breaker through the operation of an intermediate time delay relay to prevent "pumping" of the circuit breaker caused by the oscillation of the wattmetric or voltmetric relays.

Objects and advantages, other than those above set forth, will be apparent from the following description when read in connection with the accompanying drawing in which Figure 1 diagrammatically illustrates one embodiment of the present invention.

Fig. 2 illustrates a modification of the system shown in Fig. 1, in which a relay is arranged across the circuit breaker to be reclosed for operation by the voltage difference across the opened circuit breaker, and Fig. 3 illustrates a modification of a portion of the testing circuit when great sensitivity is required therein.

Referring more particularly to the drawing by characters of reference, the reference numeral 1 designates a source of direct current connected with a bus bar 2. The bus bar is connected with a feeder line 3, supplying a load 4, which may be composed of either resistances or motors, or both, by means of a circuit breaker 6. The circuit breaker is normally retained in closed position (as shown in the drawing) by a latch 7 against the action of a spring 8 tending to open the same. The latch is normally retained in its engaging position with the circuit breaker by a spring 9 and is drawn out of engagement with the circuit breaker by the action of a solenoid having an overload coil 11 connected in series into the feeder line 3. If an overload occurs on the feeder side of the circuit breaker 6, coil 11 will act to attract latch 7, thereby permitting the circuit breaker to open, which causes an auxiliary contact bar 12 on the circuit breaker to bridge contacts 13 and, likewise, causes a second auxiliary contact bar 16 to bridge contacts 17.

The system may conveniently be divided into a power circuit which is described above, a test circuit to determine whether the feeder line of the power circuit is in such condition as to safely permit reclosing of the circuit breaker 6, and a reclosing circuit for the circuit breaker.

18 represents any suitable source of alternating current which is adapted to be connected to the feeder circuit by means of bar 16 and contacts 17, of the circuit breaker 6, when the circuit breaker is opened. 24 represents any suitable type of measuring relay which may be of the cross-coil, electro-dynamic, or induction disc type. In the illustrated embodiment of the invention the relay 24 is of the electro-dynamic wattmetric type and includes current coils 48, 49 connected in series with the auxiliary source 18 and the feeder circuit by way of bar 16 and contacts 17. The relay 24 being of the wattmetric type the usual potential coils, such as 50, 51, are also included and connected across the feeder circuit 3. As it is desirable to keep the amount of energy lost in testing out the feeder circuit as small as possible and to prevent the flow of direct current from the source 1 through the coils of relay 24 current limiting resistances 22, 47, reactance 23 and condensers 21, 46, are included in the circuit between the auxiliary source 18 and the feeder circuit. When the circuit breaker 6 is in its opened position the bar 16 is in contact with the contacts 17, thereby connecting the feeder circuit with the source 18 and the coils of relay 24 which now measures the watts consumed by the feeder circuit. If the feeder circuit is short circuited, or over-loaded, the resistance thereof will be low and the number of watts consumed will be small as the voltage across the feeder circuit will be practically zero, and the pointer 26 will be retained against a stop at the left hand side of the relay 24 under the action of a spring 28, which opposes the clockwise torque of the coils. As the resistance of the feeder circuit increases the watts consumed in the feeder circuit also increases so that the force tending to rotate the pointer 26 of the relay 24 also increases. When the resistance of the feeder circuit reaches a predetermined value, the pointer 26 is rotated, against the action of spring 28, into contact with contacts 31 and completes an energizing circuit, including current source 36, for the coil of the time delay relay 33 which operates to close its contacts and establish an energizing circuit (including source 36, bar 12 and contacts 13), for the closing coil 34, thereby causing the circuit breaker to be operated to connect the direct current supply 1 with the feeder circuit 3, and to interrupt the connection of auxiliary source 18 with the feeder circuit through auxiliary bar 16 and contacts 17.

It can be shown that each position of the pointer of the measuring relay 24 not only corresponds to a certain amount of power applied thereto, but also that, by judicious selection of the constants of the reactors 21, 22, each position of the measuring relay 24 corresponds to the value of direct current delivered by the source 1 after the circuit breaker 6 has been closed with the single exception of very small currents, i. e. when the resistance of the load circuit is relatively high. The range of such small current is provided for by the use of the special relay 19 which is actuated by the current in the test circuit. As long as the current in the test circuit is sufficiently high, the contacts 37 will remain open and the relay does not interfere with the selective operation of the relay 24. If the current decreases below a certain permissible value, the coil of the relay 19 will release its armature, thus shorting its contacts 37 and thereby establish an energizing circuit for relay 33 to close its contacts 31 and cause the closing of the circuit breaker 6.

The operation of measuring relay 24 shown in the accompanying diagram may depend directly upon the ohmic resistance of the load device 4. It may, for instance, be a two coil alternating-current ohmmeter with the directional coil. When such an ohmmeter is used as a relay 24, it will respond to the reactance of the circuit, but may easily be changed so that it will respond to the ohmic resistance as, for example, by inserting ohmic resistances in series connection with the coils of the relay rather than using inductances in such connection. An ohmic relay, such as described above, will operate satisfactorily over the entire range of currents encountered. The auxiliary relay 19 may then be omitted entirely and it will be found that the operation of the system is then not dependent on the constancy of the voltage from the source 18. If the characteristics of the feeder or load circuit satisfy certain conditions, the measuring relay 24 can be replaced by a voltmetric relay, the operation of which depends solely on the voltage across the line when the test is being made instead of on the power (wattage) consumed. Such conditions are that the power factor of the feeder line 3, when supplied with alternating-current, will always be substantially the same while making the tests above described.

When the system is to be operated in connection with multiple feeders, as well as on stub-end feeders, as circumstances may require, the voltage difference across the circuit breaker may be used to determine whether or not conditions in the load circuit are favorable to reclosings of the circuit breaker. The system may then be modified as shown in Fig. 2 of the drawing in which a direct current relay 38 is connected across the contacts of circuit breaker 6 and is arranged to bridge pairs of contacts 39 or 41; the contacts 41, in series with the contacts 17, being closed when the voltage difference across the circuit breaker is high or substantially equal to the voltage of the source, as is the case for stub-end feeders above-described. The relay 24 and the attendant circuits are, therefore, again energized and operate selectively as described above. The other set of contacts 39 is connected in parallel with the contacts 31 which are short circuited when the voltage difference across the circuit breaker 6 is low enough to indicate normal conditions in the load circuit, as is the case with parallel feeder circuits. Relay 33 is then energized to close the circuit of the reclosing coil 34 thereby reclosing circuit breaker 6.

The operation of the relay 24, if it has either a wattmetric or a voltmetric characteristic (but not if it is an ohmmeter) depends on the voltage of the source 18. Without further refinements, it is sensitive to variations in the voltage source 1, inasmuch as the power flowing from the source to the load circuit 3 varies about proportionately to the square of the voltage of the source. To compensate for such variation, the spring 28 of the relay 24 may be supplemented or altogether replaced by a recall device operated by the source 18 to give a restoring torque proportional to the square of the voltage, rather than a constant torque. Such result may be obtained by arranging an aluminum disk 42 on the same shaft as is used to support the pointer 26 of the relay 24 and producing a torque on the disk from a voltage coil 43 connected across the voltage source 18 as is done in the induction type relay which needs no further description.

In the arrangement above described, if the system is to be used on multiple feeders direct-current, from sources of supply other than from the source 1, will flow through the voltage coil of the measuring relay 24 when the sources supply the bus bar 3. To prevent such occurrence, a condenser 46 is connected through a reactor 47 in such manner that compensation of the phase displacement of the condenser will not interfere with the proper operation of the relay 24.

Although but a few embodiments of the present invention have been illustrated and described, it will be apparent from the above description, when taken in connection with the accompanying drawing, that various changes and modifications may be made therein without departing from the spirit of the invention or the scope of the appended claims.

The invention claimed is:

1. In an automatic circuit breaker reclosing system, a power circuit including a source of direct current, a load circuit, and a circuit breaker connecting said source and said load circuit; a test circuit including a source of alternating current, means connected with said source of alternating current responsive to and indicating conditions in said load circuit favorable to the reclosing of said circuit breaker, and contacts controlling the flow of current from the last said source, a minimum current relay connected in series with the last said source and said means, said circuit breaker controlling opening and closing of said contacts; and a reclosing circuit including a source of current, a circuit breaker reclosing coil, and a plurality of pairs of contacts controlling flow of current from the last said source to said coil, said circuit breaker controlling opening and closing of one of said pairs of said contacts, said indicating means in said test circuit controlling another pair of said contacts, and another pair of said contacts being controlled by said minimum current relay.

2. In an automatic circuit breaker reclosing system, a power circuit including a source of current, a load circuit, a circuit breaker disposed to effect connections and disconnections of said source with and from said circuit, a test circuit including a source of alternating current, means conected with said source of alternating current responsive to certain operative conditions of said load circuit, a relay connected with said source of alternating current and with said means responsive to certain other operative conditions of said load circuit, said circuit breaker controlling the connection and disconnection of said source of alternating current and said means and said relay with and from said load circuit, a reclosing circuit including a source of current and a reclosing coil operative to effect circuit closing actuations of said circuit breaker, a plurality of sets of contacts disposed to be actuated to control the operative connection and disconnection of the last said source of current with and from the said coil to cause actuations thereof to effect said circuit closing actuations of the said circuit breaker, the said circuit breaker controlling the actuations of one of said sets of contacts, the said means controlling the actuations of another one of said sets of said contacts responsive to said predetermined operative conditions, and the said relay controlling the actuations of a set of said contacts other than the said sets of contacts controlled by the said circuit breaker and the said means, the actuations of the said set of contacts controlled by the said relay being responsive to said certain other operative conditions of said load circuit.

3. In an automatic reclosing circuit breaker system, a source of current, a load circuit, a circuit breaker disposed to effect connections and disconnections of said source with and from said circuit, a test circuit including a source of alternating current, means connected with said source of alternating current responsive to predetermined operative conditions of said load circuit, a relay connected with said load circuit and responsive to predetermined electrical potential conditions thereof, the said circuit breaker controlling the operative connection of said relay with said load circuit, the said relay and the said circuit breaker conjointly controlling the connection and disconnection of said means and said source of alternating current with and from said load circuit, a reclosing circuit including a source of current and a reclosing coil operative to effect circuit closing actuations of said circuit breaker, a plurality of sets of contacts disposed to be actuated to control the operative connection and disconnection of the last said source of current with and from said coil to cause actuations thereof to effect said circuit closing actuations of said circuit breaker, the said circuit breaker controlling the actuations of one of said sets of contacts, the said means controlling the actuations of another of said sets of contacts responsive to said certain operative conditions, and the said relay controlling the actuations of a set of said contacts other than the said sets of contacts controlled by the said circuit breaker and the said means, the actuation of the said sets of contacts controlled by the said relay being responsive to said predetermined electrical potential conditions of the said load circuit.

4. In an automatic reclosing circuit breaker system, a source of current, a load circuit, a circuit breaker disposed to effect connections and disconnections of said source with said circuit, a test circuit including a source of alternating current, means connected with said source of alternating current responsive to predetermined operative conditions of said load circuit, a relay connected with said source of alternating current and with said means responsive to certain other operative conditions of said load circuit, and a relay operatively connected with said load circuit responsive to predetermined electrical potential conditions thereof, the said circuit breaker controlling the operative connection and disconnection of each said relay and said means and said source of alternating current with and from said circuit, a reclosing circuit including a source of current and a reclosing coil operative to effect circuit closing actuations of said circuit breaker, a plurality of sets of contacts disposed to be actuated to control the connection and disconnection of the last said source of current with and from said coil to cause actuations thereof to effect said circuit closing actuations of said circuit breaker, the said actuations of said circuit breaker controllng the said actuations of one of said sets of contacts, the said actuations of the said means controlling the said actuations of a second one of said sets of contacts, the said actuations of the first said relay controlling the said actuations of a third one of said sets of contacts, the said actuations of the second said relay controlling the said actuations of a fourth one of said sets of contacts, and the said actuations of the second said relay controlling the connection of said test circuit with said load circuit.

5. In an automatic reclosing circuit breaker system, in combination with a supply circuit, a load circuit, a circuit breaker operable to one position to effect thereat the connection of said load circuit with said supply circuit and operable to another position to effect thereat the disconnection of said load circuit from said supply circuit, and means operable to cause operation of said circuit breaker to the said one position thereof, of an auxiliary source of alternating current, means operable by said circuit breaker upon movement thereof to the said another position thereof for operatively connecting said auxiliary source with said load circuit, a watt responsive element connected to be responsive to watts supplied to said load circuit from said auxiliary source in dependence upon predetermined operative conditions of said load circuit for controlling said operation of the first said means, and a current responsive element connected to be operable responsive to flow of current below a predetermined value from said auxiliary source to said load circuit for controlling said operation of the first said means.

6. In an automatic reclosing circuit breaker system, in combination with a supply circuit, a load circuit, a circuit breaker operable to one position to effect thereat the connection of said load circuit with said supply circuit and operable to another position to effect thereat the disconnection of said load circuit from said supply circuit, and means operable to cause operation of said circuit breaker to the said one position, of an auxiliary source of alternating current, means operable by said circuit breaker upon movement thereof to the said another position thereof for operatively connecting the said auxiliary source with said load circuit, an ohmmetric responsive element connected to be responsive to a predetermined ratio of the voltage to the current supplied by said auxiliary source to said load circuit for controlling said operation of the first said means, and a current responsive element connected to be operable responsive to flow of current below a predetermined value from said auxiliary source to said load circuit for controlling said operation of the first said means.

In testimony whereof we have hereunto subscribed our names this 30th day of April, A. D. 1930.

OTHMAR K. MARTI.
HAROLD WINOGRAD.
WERNER R. STREULI.